United States Patent
Dahley et al.

(10) Patent No.: US 9,854,013 B1
(45) Date of Patent: Dec. 26, 2017

(54) SYNCHRONOUS COMMUNICATION SYSTEM AND METHOD

(71) Applicant: Google Inc., Mountain View, CA (US)

(72) Inventors: Andrew M. Dahley, San Francisco, CA (US); Anil Sabharwal, Los Altos, CA (US); Seth Hamlin, Alameda, CA (US); John Patrick Enstrom, San Francisco, CA (US); Brandon David Herring, Oakland, CA (US)

(73) Assignee: GOOGLE LLC, Mountain View, CA (US)

( * ) Notice: Subject to any disclaimer, the term of this patent is extended or adjusted under 35 U.S.C. 154(b) by 220 days.

(21) Appl. No.: 14/055,237

(22) Filed: Oct. 16, 2013

(51) Int. Cl.
G06F 3/048 (2013.01)
H04L 29/06 (2006.01)
G06F 3/0481 (2013.01)

(52) U.S. Cl.
CPC .......... *H04L 65/403* (2013.01); *G06F 3/0481* (2013.01)

(58) Field of Classification Search
CPC .............. G06F 3/1415; G06F 3/04883; G06F 17/30817; G06F 3/0484; G06F 15/16; G06F 17/2785; G06F 17/30; G06F 17/30867; G06F 17/30943
See application file for complete search history.

(56) References Cited

U.S. PATENT DOCUMENTS

| | | | |
|---|---|---|---|
| 6,760,749 B1 | 7/2004 | Dunlap et al. | |
| 7,949,116 B2 | 5/2011 | Swanson | |
| 8,082,003 B2 | 12/2011 | Jee | |
| 8,395,655 B2 | 3/2013 | Robinson et al. | |
| 8,416,715 B2 * | 4/2013 | Rosenfeld | H04N 7/147 348/14.03 |
| 8,564,618 B2 | 10/2013 | Ryu et al. | |
| 2005/0278648 A1 * | 12/2005 | Taylor | H04N 5/44504 715/768 |
| 2006/0098085 A1 | 5/2006 | Nichols et al. | |
| 2006/0164508 A1 | 7/2006 | Eshkoli et al. | |
| 2007/0186177 A1 | 8/2007 | Both et al. | |

(Continued)

FOREIGN PATENT DOCUMENTS

| | | |
|---|---|---|
| WO | 2012149796 A1 | 11/2012 |
| WO | 2013024397 A1 | 2/2013 |

OTHER PUBLICATIONS

Dougherty, J., "How to record & broadcast a video conference with Google+," Nov. 5, 2012, commons.trincoll.edu, pp. 1-2.

*Primary Examiner* — William Bashore
*Assistant Examiner* — Rayeez Chowdhury
(74) *Attorney, Agent, or Firm* — RMCK Law Group, PLC

(57) ABSTRACT

A method and computing system for providing, using one or more computing devices, a synchronous communication session for a plurality of users of a social network. A first video stream of a first user of the plurality of users is rendered within a primary viewing field associated with the synchronous communication session. A placeholder for the first user of the plurality of users is rendered within a first portion of a secondary viewing field associated with the synchronous communication session. The secondary viewing field includes a plurality of portions. A video stream of the remaining users of the plurality of users is rendered within the remaining portions of the secondary viewing field.

19 Claims, 5 Drawing Sheets

(56) References Cited

U.S. PATENT DOCUMENTS

| | | |
|---|---|---|
| 2008/0016156 A1* | 1/2008 | Miceli .................. G06Q 10/10 709/204 |
| 2008/0065507 A1 | 3/2008 | Morrison et al. |
| 2008/0174570 A1* | 7/2008 | Jobs ...................... G06F 3/0488 345/173 |
| 2008/0239062 A1 | 10/2008 | Civanlar et al. |
| 2008/0276269 A1* | 11/2008 | Miller .................. G06Q 30/02 725/34 |
| 2009/0054107 A1 | 2/2009 | Feland et al. |
| 2009/0079813 A1* | 3/2009 | Hildreth ................ H04N 7/147 348/14.03 |
| 2010/0182248 A1 | 7/2010 | Chun |
| 2010/0220172 A1* | 9/2010 | Michaelis .............. H04N 7/147 348/14.08 |
| 2010/0315484 A1 | 12/2010 | Ramanathan et al. |
| 2010/0333004 A1 | 12/2010 | Kristiansen et al. |
| 2011/0119711 A1* | 5/2011 | Marshall ............ H04N 5/44591 725/41 |
| 2011/0157298 A1 | 6/2011 | Huang et al. |
| 2011/0249073 A1 | 10/2011 | Cranfill et al. |
| 2011/0270923 A1* | 11/2011 | Jones .................... G06F 3/0421 709/204 |
| 2011/0286716 A1* | 11/2011 | Alderson ................ H04N 7/15 386/230 |
| 2012/0122590 A1 | 5/2012 | Nguyen |
| 2012/0182384 A1 | 7/2012 | Anderson et al. |
| 2012/0215380 A1* | 8/2012 | Fouillade ............. G05D 1/0038 701/2 |
| 2012/0262537 A1 | 10/2012 | Baker et al. |
| 2012/0268553 A1 | 10/2012 | Talukder |
| 2012/0290977 A1 | 11/2012 | Devecka |
| 2013/0063542 A1* | 3/2013 | Bhat ........................ H04N 7/15 348/14.03 |
| 2013/0155099 A1 | 6/2013 | Ha et al. |
| 2013/0194378 A1* | 8/2013 | Brown .................. H04N 7/152 348/14.09 |
| 2013/0198629 A1 | 8/2013 | Tandon et al. |
| 2013/0205408 A1 | 8/2013 | Yerli |
| 2013/0208187 A1 | 8/2013 | Bhogal et al. |
| 2013/0216206 A1 | 8/2013 | Dubin et al. |
| 2013/0231185 A1 | 9/2013 | Steil |
| 2013/0263021 A1* | 10/2013 | Dunn .................. H04L 12/1827 715/756 |
| 2014/0036090 A1* | 2/2014 | Black ............... H04N 21/44016 348/159 |
| 2014/0068065 A1* | 3/2014 | Mallet .................... G06Q 50/01 709/224 |
| 2014/0267572 A1 | 9/2014 | Bright-Thomas |
| 2014/0368734 A1* | 12/2014 | Hoffert ............. H04N 5/44591 348/564 |

* cited by examiner

US 9,854,013 B1

SYNCHRONOUS COMMUNICATION SYSTEM AND METHOD

TECHNICAL FIELD

This disclosure relates to synchronous communication sessions and, more particularly, to the rendering of synchronous communication sessions.

BACKGROUND

The Internet currently allows for the free exchange of ideas and information in a manner that was unimaginable only a couple of decades ago. One such use for the Internet is as a communication medium, whether it is via one-on-one exchanges or multi-party exchanges. For example, two individuals may exchange private emails with each other. Alternatively, multiple people may participate on a public website in which they may post entries that are published for multiple people to read. Examples of such websites may include but are not limited to product/service review sites and topical blogs.

As is known in the art, social networks allow for users to engage in a quasi-real-time, interactive dialogue. Social networking websites have allowed people to interact and socialize in ways that were unimaginable ten years ago. For example, the use of such social networking websites has allowed for long lost friends to be reunited, long-distance friendships to be easily maintained, and information to be broadcast to groups of people.

SUMMARY OF DISCLOSURE

In one implementation, a computer-implemented method includes providing, using one or more computing devices, a synchronous communication session for a plurality of users of a social network. A first video stream of a first user of the plurality of users is rendered within a primary viewing field associated with the synchronous communication session. A placeholder for the first user of the plurality of users is rendered within a first portion of a secondary viewing field associated with the synchronous communication session. The secondary viewing field includes a plurality of portions. A video stream of the remaining users of the plurality of users is rendered within the remaining portions of the secondary viewing field. The placeholder for the first user of the plurality of users includes one or more of: information concerning the first user of the plurality of users and a partially-obscured version of the video stream of the first user of the plurality of users.

In another implementation, a computer-implemented method includes providing, using one or more computing devices, a synchronous communication session for a plurality of users of a social network. A first video stream of a first user of the plurality of users is rendered within a primary viewing field associated with the synchronous communication session. A placeholder for the first user of the plurality of users is rendered within a first portion of a secondary viewing field associated with the synchronous communication session. The secondary viewing field includes a plurality of portions. A video stream of the remaining users of the plurality of users is rendered within the remaining portions of the secondary viewing field.

One or more of the following features may be included. The first user of the plurality of users may be currently addressing the remaining users of the plurality of users within the synchronous communication session. The primary viewing field may be larger than each of the plurality of portions of the secondary viewing field. A request concerning session options for an identified user of the plurality of users may be received from a requesting user of the plurality of users. In response to receiving the request, an options menu concerning the identified user may be rendered. The options menu may define a plurality of available options concerning the identified user. The plurality of available options may include one or more of: moving the identified user into the primary viewing field; muting the audio of the identified user; viewing a profile associated with the identified user; blocking the identified user from viewing a video stream associated with the requesting user; and expelling the identified user from the synchronous communication session.

The placeholder for the first user of the plurality of users may include information concerning the first user of the plurality of users. The information concerning the first user of the plurality of users may include one or more of: identification information for the first user of the plurality of users; and contact information for the first user of the plurality of users. The placeholder for the first user of the plurality of users may include: a partially-obscured version of the video stream of the first user of the plurality of users. The partially-obscured version of the video stream of the first user may include a grayed-out version of the video stream of the first user.

In another implementation, a computing system including a processor and memory is configured to perform operations including providing, using one or more computing devices, a synchronous communication session for a plurality of users of a social network. A first video stream of a first user of the plurality of users is rendered within a primary viewing field associated with the synchronous communication session. A placeholder for the first user of the plurality of users is rendered within a first portion of a secondary viewing field associated with the synchronous communication session. The secondary viewing field includes a plurality of portions. A video stream of the remaining users of the plurality of users is rendered within the remaining portions of the secondary viewing field.

One or more of the following features may be included. The first user of the plurality of users may be currently addressing the remaining users of the plurality of users within the synchronous communication session. The primary viewing field may be larger than each of the plurality of portions of the secondary viewing field. A request concerning session options for an identified user of the plurality of users may be received from a requesting user of the plurality of users. In response to receiving the request, an options menu concerning the identified user may be rendered. The options menu may define a plurality of available options concerning the identified user. The plurality of available options may include one or more of: moving the identified user into the primary viewing field; muting the audio of the identified user; viewing a profile associated with the identified user; blocking the identified user from viewing a video stream associated with the requesting user; and expelling the identified user from the synchronous communication session.

The placeholder for the first user of the plurality of users may include information concerning the first user of the plurality of users. The information concerning the first user of the plurality of users may include one or more of: identification information for the first user of the plurality of users; and contact information for the first user of the plurality of users. The placeholder for the first user of the plurality of users may include: a partially-obscured version of the video stream of the first user of the plurality of users. The partially-obscured version of the video stream of the first user may include a grayed-out version of the video stream of the first user.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

System Overview

Figure 1:
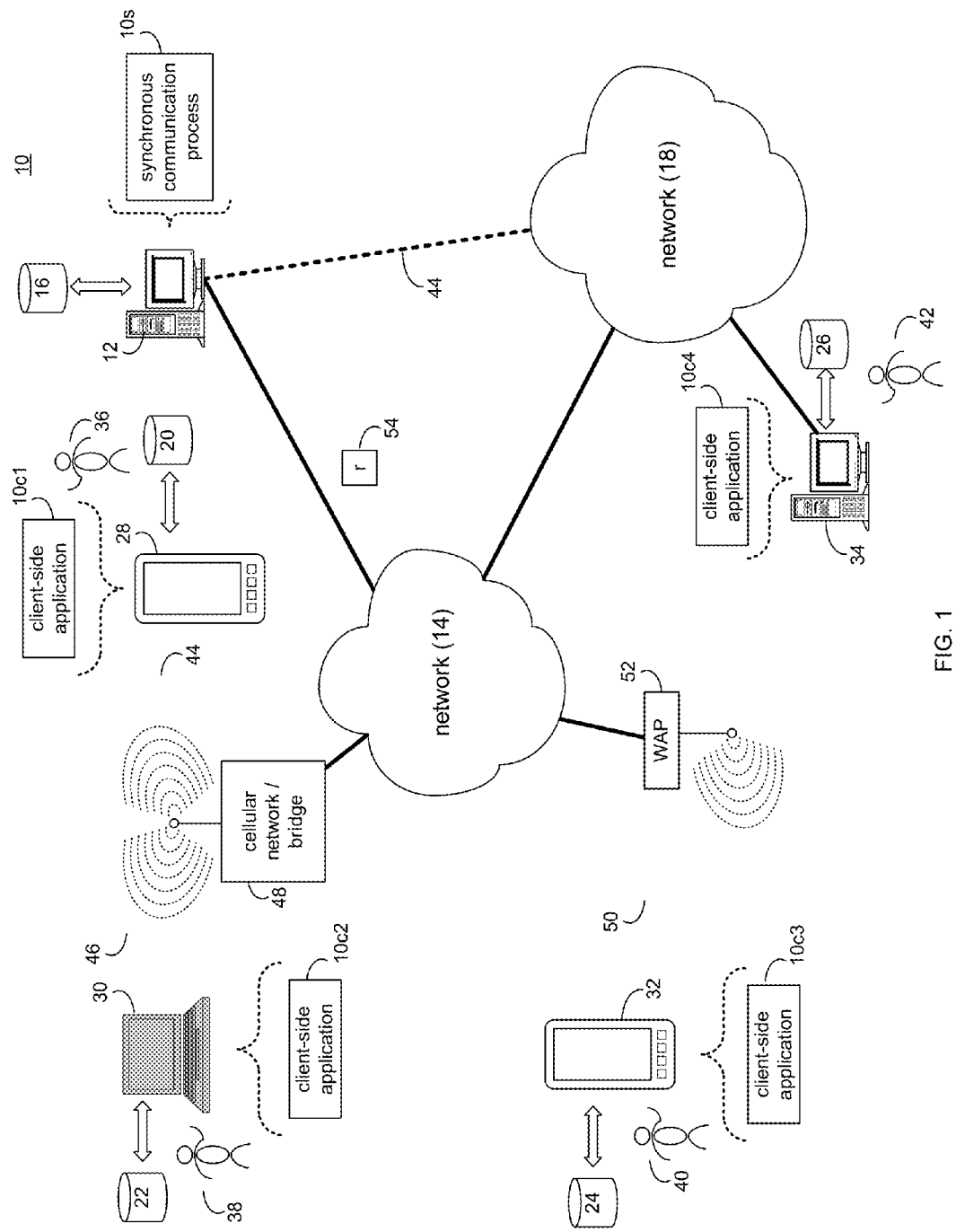
FIG. 1 is a diagrammatic view of a distributed computing network including a computing device that executes a synchronous communication process according to an embodiment of the present disclosure.
Figure 2:
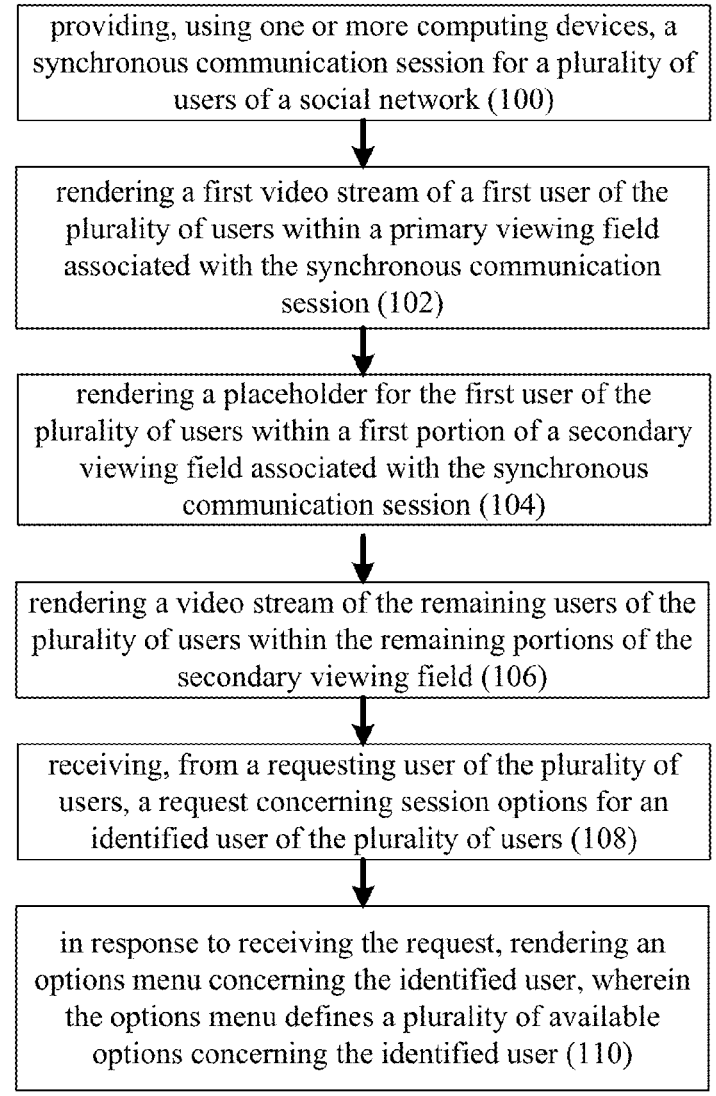
FIG. 2 is a flowchart of the synchronous communication process of FIG. 1 according to an embodiment of the present disclosure.

In FIGS. 1 & 2, there is shown synchronous communication process 10. Synchronous communication process 10 may be implemented as a server-side process, a client-side process, or a hybrid server-side/client-side process. For example, synchronous communication process 10 may be implemented as a purely server-side process via synchronous communication process 10s. Alternatively, synchronous communication process 10 may be implemented as a purely client-side process via one or more of synchronous communication process 10c1, synchronous communication process 10c2, synchronous communication process 10c3, and synchronous communication process 10c4. Alternatively still, synchronous communication process 10 may be implemented as a hybrid server-side/client-side process via synchronous communication process 10s in combination with one or more of synchronous communication process 10c1, synchronous communication process 10c2, synchronous communication process 10c3, and synchronous communication process 10c4. Accordingly, synchronous communication process 10 as used in this disclosure may include any combination of synchronous communication process 10s, synchronous communication process 10c1, synchronous communication process 10c2, synchronous communication process 10c3, and synchronous communication process 10c4.

As will be discussed below in greater detail, synchronous communication process 10 may provide 100 a synchronous communication session for a plurality of users of a social network. Synchronous communication process 10 may render 102 a first video stream of a first user of the plurality of users within a primary viewing field associated with the synchronous communication session. Synchronous communication process 10 may render 104 a placeholder for the first user of the plurality of users within a first portion of a secondary viewing field associated with the synchronous communication session. The secondary viewing field may include a plurality of portions. Synchronous communication process 10 may render 106 a video stream of the remaining users of the plurality of users within the remaining portions of the secondary viewing field.

Synchronous communication process 10s may be a server application and may reside on and may be executed by computing device 12, which may be connected to network 14 (e.g., the Internet or a local area network). Examples of computing device 12 may include, but are not limited to: a personal computer, a laptop computer, a tablet computer, a personal digital assistant, a data-enabled cellular telephone, a notebook computer, a television with one or more processors embedded therein or coupled thereto, a server computer, a series of server computers, a mini computer, a mainframe computer, or a dedicated network device.

The instruction sets and subroutines of synchronous communication process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of synchronous communication processes 10c1, 10c2, 10c3, 10c4 may include but are not limited to a web browser, a game console user interface, a social network user interface, or a specialized application (e.g., an application running on e.g., an Android™ or iOS™ platform). The instruction sets and subroutines of synchronous communication processes 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, data-enabled, cellular telephone 28, laptop computer 30, personal digital assistant 32, personal computer 34, a tablet computer (not shown), a notebook computer (not shown), a server computer (not shown), a gaming console (not shown), and a dedicated network device (not shown). Client electronic devices 28, 30, 32, 34 may each execute an operating system, examples of which may include but are not limited to Microsoft Windows™, Android™, WebOS™, iOS™, Redhat Linux™, or a custom operating system.

Users 36, 38, 40, 42 may access synchronous communication process 10 directly through network 14 or through secondary network 18. Further, synchronous communication process 10 may be connected to network 14 through secondary network 18, as illustrated with link line 44.

The various client electronic devices (e.g., client electronic devices 28, 30, 32, 34) may be directly or indirectly coupled to network 14 (or network 18). For example, data-enabled, cellular telephone 28 and laptop computer 30 are shown wirelessly coupled to network 14 via wireless communication channels 44, 46 (respectively) established between data-enabled, cellular telephone 28, laptop computer 30 (respectively) and cellular network/bridge 48, which is shown directly coupled to network 14. Further, personal digital assistant 32 is shown wirelessly coupled to network 14 via wireless communication channel 50 established between personal digital assistant 32 and wireless access point (i.e., WAP) 52, which is shown directly coupled to network 14. Additionally, personal computer 34 is shown directly coupled to network 18 via a hardwired network connection.

WAP 52 may be, for example, an IEEE 802.11a, 802.11b, 802.11g, 802.11n, Wi-Fi, and/or Bluetooth device that is capable of establishing wireless communication channel 50 between personal digital assistant 32 and WAP 52. As is known in the art, IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

As is known in the art, users of social networks may be able to participate in group communication sessions, such as multiuser video chat sessions that allow for virtual gatherings of people so that they may chat about various topics.

Specifically and as will be discussed below in greater detail, synchronous communication process 10 may be configured to provide a synchronous communication session for a plurality of users of a social network. A first video stream of a first user (of the plurality of users) may be rendered within a primary viewing field associated with the synchronous communication session. This may be a larger viewing field that may be positioned within a dominant portion of the viewing screen. A placeholder for the first user (of the plurality of users) may be rendered within a first portion of a secondary viewing field associated with the synchronous communication session. Examples of this placeholder may include but are not limited to a) information concerning the first user and b) a partially-obscured version of the video stream of the first user. The second secondary viewing field may include a plurality of portions, within which the video streams of the remaining users of the synchronous communication session may be rendered.

Synchronous Communication Process

Figure 3:
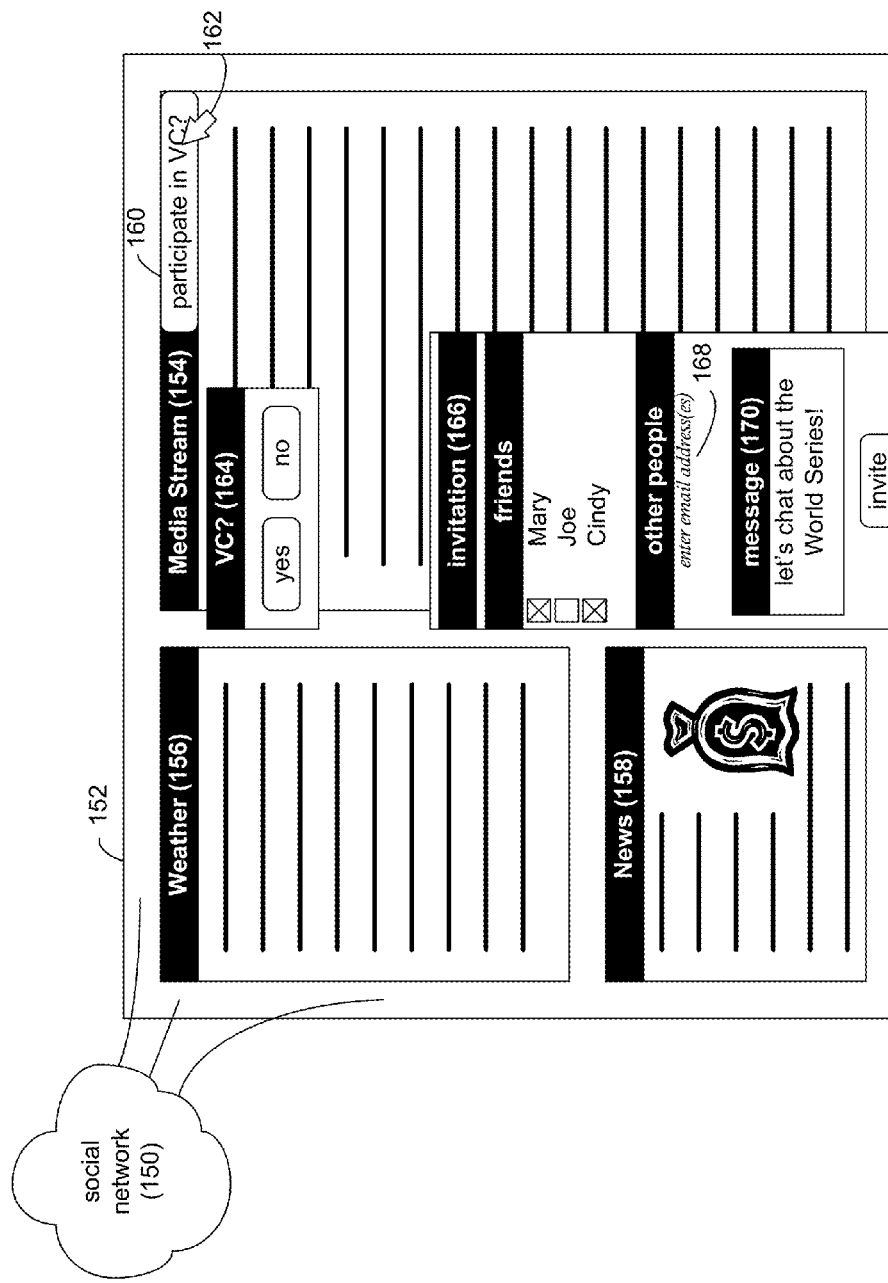
FIG. 3 is a diagrammatic view of a display screen rendered by the synchronous communication process of FIG. 1 according to an embodiment of the present disclosure.

Referring also to FIG. 3, synchronous communication process 10 may be included within, executed within, or a portion of a social network (e.g., social network 150). Social network 150 may include graphical user interface 152, which may be divided into a plurality of sections, such as media stream 154, weather 156 and news 158.

Assume for illustrative purposes that user 36 (i.e. Mark) is an avid baseball fan and is looking forward to the upcoming World Series, and that Mary (user 38), Joe (user 40), and Cindy (user 42) are also baseball fans. Further assume for illustrative purposes that user 36, 38, 40, 42 wish to participate in a synchronous communication session (e.g., a video conference) so that they may discuss the upcoming World Series. Accordingly, user 36 may select e.g., participate in VC button 160 using onscreen pointer 162 (which is controllable via a mouse, not shown). Alternatively and if the client electronic device includes a touch screen, user 36 may select e.g., participate in VC button 160 by tapping on the same.

Upon user 36 making this selection, synchronous communication process 10 may render VC confirmation window 164 that may allow users 36 to confirm that they wish to participate in a synchronous communication session (e.g., a video conference) concerning e.g., the upcoming World Series. For example, if user 36 wishes to participate in a synchronous communication session, user 36 may select the "yes" button included within VC confirmation window 164. Alternatively, if user 36 does not wish to participate in such a synchronous communication session, user 36 may select the "no" button included within VC confirmation window 164.

Figure 4:
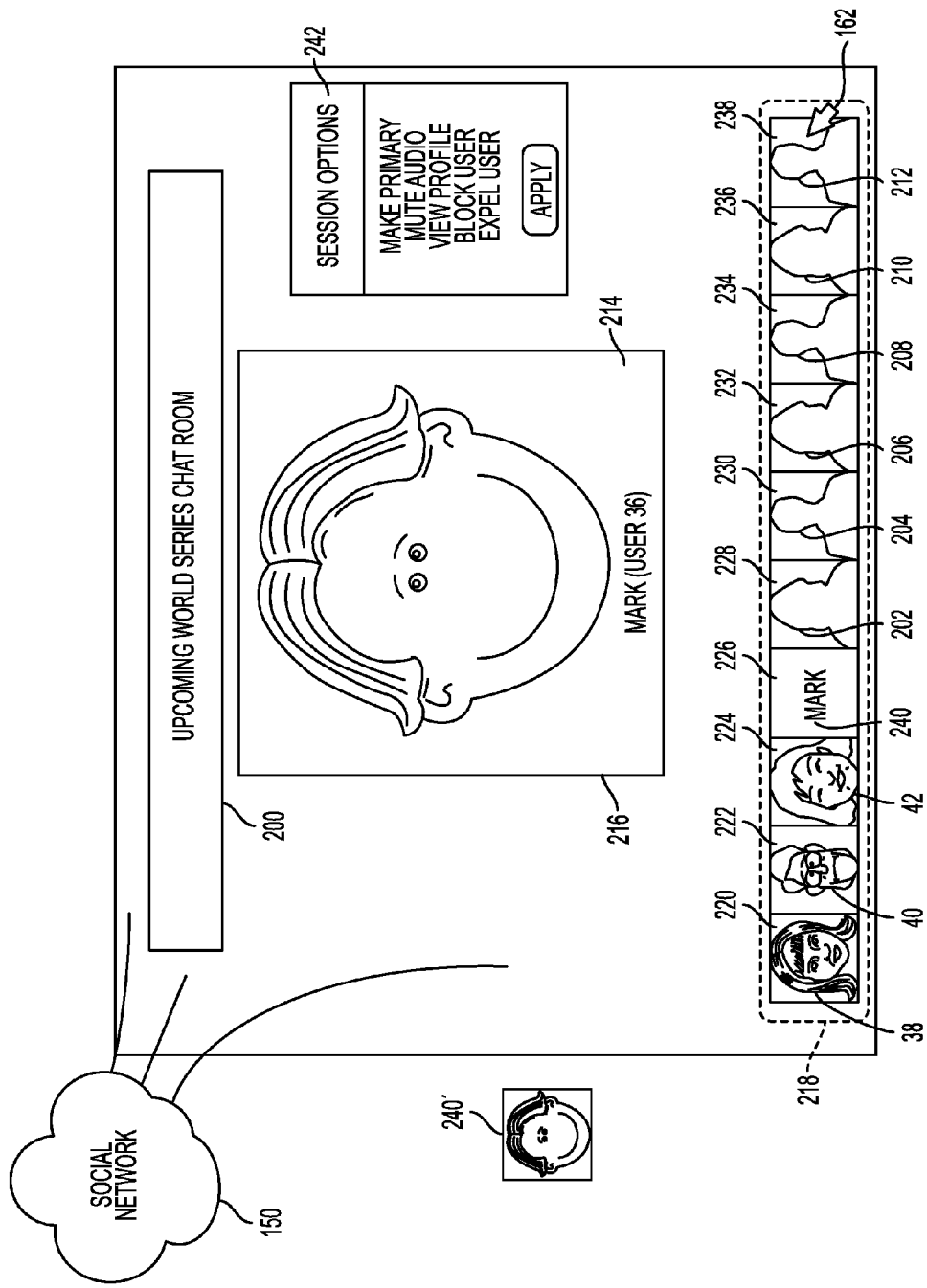
FIG. 4 is a diagrammatic view of another display screen rendered by the synchronous communication process of FIG. 1 according to an embodiment of the present disclosure.

Referring also to FIG. 4, assume for illustrative purposes that user 36 wishes to participate in such a synchronous communication session (e.g., synchronous communication session 200) concerning e.g., the upcoming World Series. Accordingly, user 36 may select the "yes" button included within VC confirmation window 164, resulting in the rendering of invitation window 166 that may be configured to allow user 36 to identify invitee(s) for synchronous communication session 200 (e.g., the video conference).

Invitation window 166 may be configured to allow user 36 to invite various types of individuals to synchronous communication session 200. For example, invitation window 166 may be configured to identify members of social network 150 that are friends with/connected to user 36. For example, assume that user 36 is friends with Mary (user 38), Joe (user 40), and Cindy (user 42). As users 38, 40, 42 wish to participate in synchronous communication session 200, user 36 may check the appropriate check box next to the name of each of these users.

Additionally, invitation window 166 may be configured to allow user 36 to invite people that are not members of social network 150. Accordingly, user 36 may populate email field 168 with the email address(es) of people that that they wish to invite to join synchronous communication session 200 but are currently not members of social network 150.

Invitation window 166 may include message field 170 that may allow user 36 to define a text-based comment concerning synchronous communication session 200. For example, user 36 may add the comment "let's chat about the World Series!". Accordingly, the text-based comment may be used as a descriptor for synchronous communication session 200.

Once the appropriate people are identified within invitation window 166, user 36 may select (e.g., via onscreen pointer 162 or a tap command) the "invite" button included within invitation window 166 and synchronous communication process 10 may notify users 38, 40, 42 that user 36 wishes to have a video conference (e.g., synchronous communication session 200) concerning the upcoming World Series. If a person notified about synchronous communication session 200 is not a member of social network 150, that person may first be asked to join social network 150 and, upon joining social network 150, may be allowed to participate in synchronous communication session 200.

While the following discussion concerns synchronous communication session 200 being an audio-video, synchronous communication session, this is for illustrative purposes only and is not intended to be a limitation of this disclosure, as other configurations are possible (e.g., a multi-user, video conference that includes one or more audio-only participants) and are considered to be within the scope of this disclosure.

Synchronous communication process 10 may provide 100 synchronous communication session 200 for a plurality of users (e.g., users 36, 38, 40, 42) of social network 150. Assume for illustrative purposes that additional users are also participating in synchronous communication session 200, namely users 202, 204, 206, 208, 210, 212.

Synchronous communication process 10 may be configured to provide visual prominence to the user that is currently speaking within synchronous communication session 200. Assume for illustrative purposes that when synchronous communication session 200 is started, user 36 leads off the discussion concerning the upcoming World Series. Accordingly, synchronous communication process 10 may provide visual prominence to user 36, as user 36 is currently addressing the remaining users (e.g., users 38, 40, 42, 202, 204, 206, 208, 210, 212) of the plurality of users within synchronous communication session 200. Therefore, synchronous communication process 10 may render 102 a first video stream (e.g., video stream 214) of a first user (e.g., user 36) of the plurality of users (e.g., users 36, 38, 40, 42, 202, 204, 206, 208, 210, 212) within a primary viewing field (e.g., primary viewing field 216) associated with synchronous communication session 200. Whenever one of the other users (e.g., users 38, 40, 42, 202, 204, 206, 208, 210, 212) speaks within synchronous communication session 200, synchronous communication process 10 may be configured to automatically position the video stream associated with the speaking user within primary viewing field 216.

Synchronous communication session 200 may include secondary viewing field 218 associated with synchronous communication session 200, which may include a plurality of portions (e.g., one for each of the participants of synchronous communication session 200). While in this particular example, secondary viewing field 218 is shown to include ten portions (namely portions 220, 222, 224, 226, 228, 230, 232, 234, 236, 238), this is for illustrative purposes only and is not intended to be a limitation of this disclosure, as other configurations are possible and are considered to be within the scope of this disclosure. Specifically, the quantity of portions included within secondary viewing field 218 may be increased/decreased depending on the number of users participating in synchronous communication session 200.

Since and as discussed above, synchronous communication process 10 may provide visual prominence to the user that is currently addressing the remaining users within synchronous communication session 200, primary viewing field 216 may be larger than each of the plurality of portions (namely portions 220, 222, 224, 226, 228, 230, 232, 234, 236, 238) included within the secondary viewing field 218.

Synchronous communication process 10 may render 104 a placeholder (e.g., placeholder 240) for the first user (e.g., user 36 who is currently speaking) of the plurality of users (e.g., users 36, 38, 40, 42, 202, 204, 206, 208, 210, 212) within a first portion (e.g., portion 226) of secondary viewing field 218.

Placeholder 240 for the first user (e.g., user 36) of the plurality of users (e.g., users 36, 38, 40, 42, 202, 204, 206, 208, 210, 212) may include information concerning the first user (e.g., user 36), that is the user who is currently speaking. Examples of such information may include but is not limited to one or more of: identification information for the first user (e.g., user 36), such as name and title; and/or contact information for the first user (e.g., user 36), such as an email address, a mailing address, a home phone number, an office phone number, a cell phone number, a social network user name, or a webpage.

Alternatively, placeholder 240 for the first user (e.g., user 36) of the plurality of users (e.g., users 36, 38, 40, 42, 202, 204, 206, 208, 210, 212) may include a partially-obscured version of the video stream (e.g., video stream 214) of the first user (e.g., user 36). An example of such a partially-obscured version of the video stream (e.g., video stream 214) of user 36 may include but is not limited to a grayed-out version (e.g., alternate placeholder 240') of the video stream (e.g., video stream 214).

Further, synchronous communication process 10 may render 106 a video stream of the remaining users of the plurality of users (e.g., users 38, 40, 42, 202, 204, 206, 208, 210, 212) within the remaining portions of secondary viewing field 218. Specifically: a video stream for user 38 may be rendered 106 within portion 220 of secondary viewing field 218; a video stream for user 40 may be rendered 106 within portion 222 of secondary viewing field 218; a video stream for user 42 may be rendered 106 within portion 224 of secondary viewing field 218; a video stream for user 202 may be rendered 106 within portion 228 of secondary viewing field 218; a video stream for user 204 may be rendered 106 within portion 230 of secondary viewing field 218; a video stream for user 206 may be rendered 106 within portion 232 of secondary viewing field 218; a video stream for user 208 may be rendered 106 within portion 234 of secondary viewing field 218; a video stream for user 210 may be rendered 106 within portion 236 of secondary viewing field 218; and a video stream for user 212 may be rendered 106 within portion 238 of secondary viewing field 218.

In the event that a user wishes to perform a certain action with respect to an identified user of synchronous communication session 200, the user wishing to perform the action may request the same from synchronous communication process 10. For example, in the event the client electronic device is controllable by a mouse (not shown), the requesting user may hover onscreen pointer 162 over the video stream of the identified user of synchronous communication session 200 to generate request 54 (FIG. 1). In the event the client electronic device is a touch screen device, the requesting user may tap the video stream of the identified user of synchronous communication session 200 to generate request 54 (FIG. 1).

Upon receiving 108 request 54, synchronous communication process 10 may render 110 options menu 242 concerning the identified user, wherein options menu 242 may define a plurality of available options concerning the identified user. Examples of these plurality of available options may include but are not limited to one or more of: moving the identified user into primary viewing field 216; muting the audio of the identified user; viewing a profile associated with the identified user; blocking the identified user from viewing a video stream associated with the requesting user; and expelling the identified user from synchronous communication session 200.

For example, assume that the requesting user is user 38 and the identified user is user 40. Therefore, if user 38 wants to view user 40 within primary viewing field 216, user 38 may select the "make primary" option within options menu 242; if user 38 wants to mute user 40 (as user 40 is generating a lot of background noise), user 38 may select the "mute audio" option within options menu 242; if user 38 wants to learn more about user 40, user 38 may select the "view profile" option within options menu 242; if user 38 wants to prevent user 40 from seeing their video stream, user 38 may select the "block user" option within options menu 242; and if user 38 wants to expel user 40 from synchronous communication session 200 (e.g., they are using coarse language), user 38 may select the "expel user" option within options menu 242 (which may require administrative privileges or the concurrence of multiple users).

General

Figure 5:
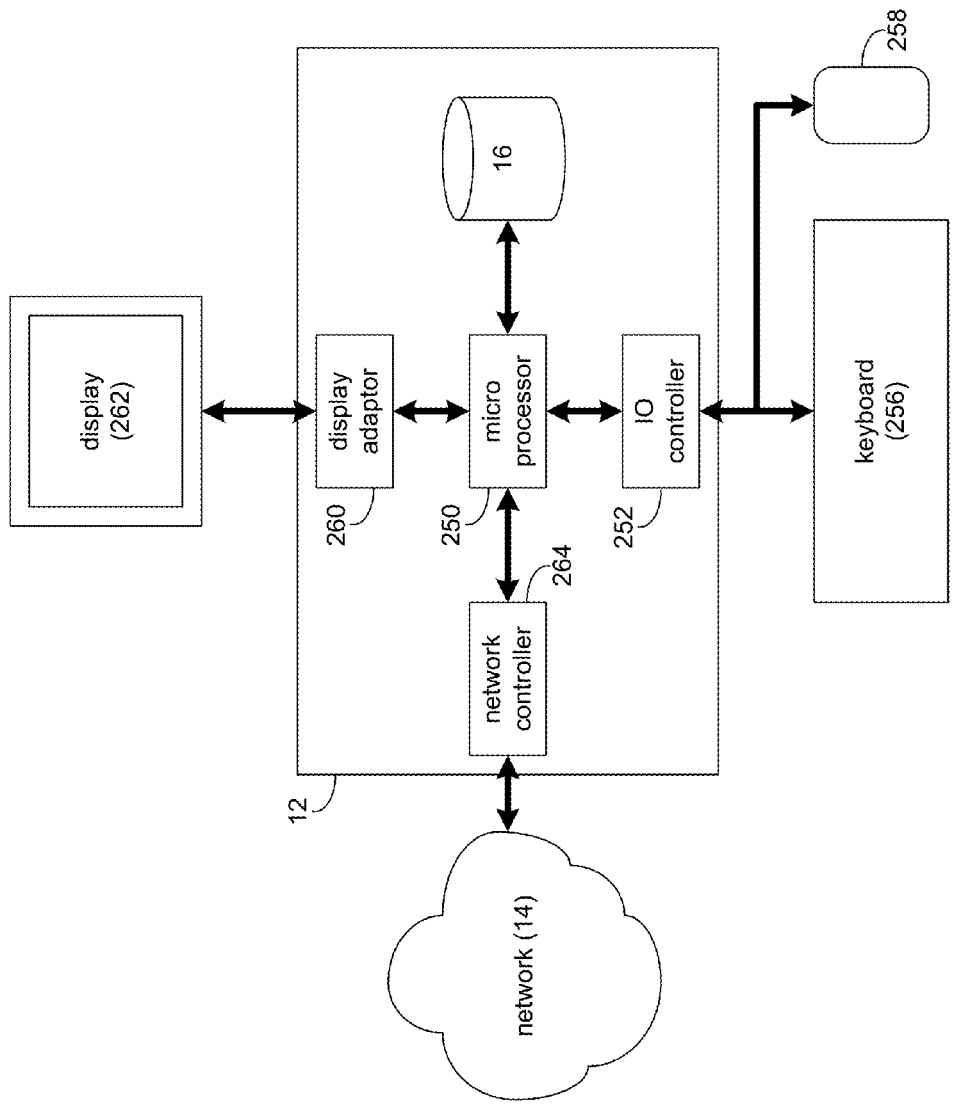
FIG. 5 is a diagrammatic view of the computing device of FIG. 1 according to an embodiment of the present disclosure.

Referring also to FIG. 5, there is shown a diagrammatic view of computing system 12. While computing system 12 is shown in this figure, this is for illustrative purposes only and is not intended to be a limitation of this disclosure, as other configuration are possible. For example, any computing device capable of executing, in whole or in part, synchronous communication process 10 may be substituted for computing device 12 within FIG. 5, examples of which may include but are not limited to client electronic devices 28, 30, 32, 34.

Computing system 12 may include microprocessor 250 configured to e.g., process data and execute instructions/code for synchronous communication process 10. Microprocessor 250 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 252 may be configured to couple microprocessor 250 with various devices, such as keyboard 256, mouse 258, USB ports (not shown), and printer ports (not shown). Display adaptor 260 may be configured to couple display 262 (e.g., a CRT or LCD monitor) with microprocessor 250, while network adapter 264 (e.g., an Ethernet adapter) may be configured to couple microprocessor 250 to network 14 (e.g., the Internet or a local area network).

As will be appreciated by one skilled in the art, the present disclosure may be embodied as a method (e.g., executing in whole or in part on computing device 12), a system (e.g., computing device 12), or a computer program product (e.g., encoded within storage device 16). Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium (e.g., storage device 16) having computer-usable program code embodied in the medium.

Any suitable computer usable or computer readable medium (e.g., storage device 16) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor (e.g., processor 250) of a general purpose computer/special purpose computer/other programmable data processing apparatus (e.g., computing device 12), such that the instructions, which execute via the processor (e.g., processor 250) of the computer or other programmable data processing apparatus, create means for implementing the functions/acts specified in the flowchart and/or block diagram block or blocks.

These computer program instructions may also be stored in a computer-readable memory (e.g., storage device 16) that may direct a computer (e.g., computing device 12) or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer (e.g., computing device 12) or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
providing, using one or more computing devices, a synchronous communication session for a plurality of users of a social network;
rendering a first video stream of a first user of the plurality of users within a primary viewing field associated with the synchronous communication session;
rendering a placeholder for the first user of the plurality of users within a first portion of a secondary viewing field associated with the synchronous communication session, wherein the secondary viewing field includes a plurality of portions; and
rendering video streams of the remaining users of the plurality of users within the remaining portions of the secondary viewing field, wherein the first video stream of the first user within the primary viewing field, the placeholder for the first user within the first portion of the secondary viewing field, and the video stream of the remaining users within the remaining portions of the secondary viewing field are rendered simultaneously and such that the rendered first video stream within the primary viewing field is larger in size than each of the rendered placeholder and the rendered video streams within the secondary viewing field, and wherein the placeholder for the first user of the plurality of users is fully visible and includes one or more of:
information concerning the first user of the plurality of users, and
a grayed-out version of the first video stream of the first user.

2. A computer-implemented method comprising:
providing, using one or more computing devices, a synchronous communication session for a plurality of users of a social network;
rendering a first video stream of a first user of the plurality of users within a primary viewing field associated with the synchronous communication session;
rendering a placeholder for the first user of the plurality of users within a first portion of a secondary viewing field associated with the synchronous communication session, wherein the secondary viewing field includes a plurality of portions;
rendering video streams of the remaining users of the plurality of users within the remaining portions of the secondary viewing field, wherein the first video stream of the first user within the primary viewing field, the placeholder for the first user within the first portion of the secondary viewing field, and the video stream of the remaining users within the remaining portions of the secondary viewing field are rendered simultaneously such that the rendered first video stream within the primary viewing field is larger in size than each of the rendered placeholder and the rendered video streams within the secondary viewing field;
receiving, from a requesting user of the plurality of users, a request concerning session control options for an identified user of the plurality of users; and
in response to receiving the request, rendering a control options pop-up menu concerning the identified user, wherein the control options menu defines a plurality of available control options concerning the identified user, each available control option being configured to control an aspect of the identified user's participation in the synchronous communication session.

3. The computer-implemented method of claim 2 wherein the first user of the plurality of users is currently addressing the remaining users of the plurality of users within the synchronous communication session.

4. The computer-implemented method of claim 2 wherein the plurality of available control options includes at least one of:
moving the identified user into the primary viewing field;
muting the audio of the identified user;
blocking the identified user from viewing a video stream associated with the requesting user; and
expelling the identified user from the synchronous communication session.

5. The computer-implemented method of claim 2, wherein
the placeholder for the first user of the plurality of users includes information concerning the first user of the plurality of users, including one or more of:

identification information for the first user of the plurality of users; and contact information for the first user of the plurality of users.

6. The computer-implemented method of claim 2, wherein the placeholder for the first user of the plurality of users is fully visible and includes:

an at least partially-obscured version of the first video stream of the first user of the plurality of users.

7. The computer-implemented method of claim 6, wherein the at least partially-obscured version of the first video stream of the first user is a grayed-out version of the first video stream of the first user.

8. A computing system including a processor and memory configured to perform operations comprising:

providing, using one or more computing devices, a synchronous communication session for a plurality of users of a social network;

rendering a first video stream of a first user of the plurality of users within a primary viewing field associated with the synchronous communication session;

rendering a placeholder for the first user of the plurality of users within a first portion of a secondary viewing field associated with the synchronous communication session, wherein the secondary viewing field includes a plurality of portions;

rendering video streams of the remaining users of the plurality of users within the remaining portions of the secondary viewing field, wherein the first video stream of the first user within the primary viewing field, the placeholder for the first user within the first portion of the secondary viewing field, and the video stream of the remaining users within the remaining portions of the secondary viewing field are rendered simultaneously such that the rendered first video stream within the primary viewing field is larger in size than each of the rendered placeholder and the rendered video streams within the secondary viewing field;

receiving, from a requesting user of the plurality of users, a request concerning session control options for an identified user of the plurality of users; and in response to receiving the request, rendering a control options pop-up menu concerning the identified user, wherein the control options menu defines a plurality of available control options concerning the identified user, each available control option being configured to control an aspect of the identified user's participation in the synchronous communication session.

9. The computing system of claim 8 wherein the first user of the plurality of users is currently addressing the remaining users of the plurality of users within the synchronous communication session.

10. The computing system of claim 8, wherein the plurality of available control options includes at least one of:

moving the identified user into the primary viewing field;

muting the audio of the identified user;

blocking the identified user from viewing a video stream associated with the requesting user; and expelling the identified user from the synchronous communication session.

11. The computing system of claim 8, wherein the placeholder for the first user of the plurality of users includes information concerning the first user of the plurality of users, including one or more of:

identification information for the first user of the plurality of users; and contact information for the first user of the plurality of users.

12. The computing system of claim 8, wherein the placeholder for the first user of the plurality of users is fully visible and includes:

an at least partially-obscured version of the first video stream of the first user.

13. The computing system of claim 12, wherein the at least partially-obscured version of the first video stream of the first user is a grayed-out version of the first video stream of the first user of the plurality of users.

14. The computer-implemented method of claim 2, wherein the request concerning control session options for the identified user includes a mouse-over or selection of a particular portion of the secondary viewing field associated with the identified user.

15. The computer-implemented method of claim 14, wherein the control options pop-up menu is rendered proximate the particular portion of the secondary viewing field associated with the identified user.

16. The computer-implemented method of claim 2, wherein the plurality of available control options includes at least one of:

moving the identified user into the primary viewing field;

muting the audio of the identified user;

blocking the identified user from viewing a video stream associated with the requesting user; and expelling the identified user from the synchronous communication session.

17. The computing system of claim 8, wherein the request concerning control session options for the identified user includes a mouse-over or selection of a particular portion of the secondary viewing field associated with the identified user.

18. The computing system of claim 17, wherein the control options pop-up menu is rendered proximate the particular portion of the secondary viewing field associated with the identified user.

19. The computing system of claim 8, wherein the plurality of available control options includes at least:

moving the identified user into the primary viewing field;

muting the audio of the identified user;

blocking the identified user from viewing a video stream associated with the requesting user; and expelling the identified user from the synchronous communication session.

* * * * *